United States Patent

Lardennois

[11] Patent Number: 5,995,845
[45] Date of Patent: Nov. 30, 1999

[54] CELLULAR SYSTEM FOR TRANSMISSION OF INFORMATION BY RADIO BETWEEN AN INFRASTRUCTURE AND MOVING BODIES

[75] Inventor: Regis Lardennois, Paris, France

[73] Assignee: Matra Transport International, Paris, France

[21] Appl. No.: 08/956,127

[22] Filed: Oct. 22, 1997

[30] Foreign Application Priority Data

Oct. 24, 1996 [JP] Japan ...................................... 8-12987

[51] Int. Cl.$^6$ ...................................................... H04B 7/20
[52] U.S. Cl. ......................... 455/506; 455/11.1; 455/502
[58] Field of Search ................................... 455/506, 502, 455/500, 414, 524, 11.1, 15, 16, 25, 66

[56] References Cited

U.S. PATENT DOCUMENTS

| | | |
|---|---|---|
| 3,781,687 | 12/1973 | Nakahara et al. ........................ 325/52 |
| 4,209,749 | 6/1980 | Becker et al. ............................. 455/56 |
| 4,910,793 | 3/1990 | Mainardi ................................... 455/55 |
| 4,932,617 | 6/1990 | Heddebaut et al. ........................ 246/8 |
| 5,347,562 | 9/1994 | Candy ..................................... 455/502 |
| 5,363,376 | 11/1994 | Chuang et al. ........................... 455/502 |
| 5,375,140 | 12/1994 | Bustamante et al. .................... 455/502 |
| 5,496,003 | 3/1996 | Bernard .................................... 246/29 |
| 5,878,327 | 3/1999 | Hayashi et al. .......................... 455/562 |

*Primary Examiner*—Edward F. Urban
*Assistant Examiner*—Thuan Nguyen
*Attorney, Agent, or Firm*—Larson & Taylor

[57] ABSTRACT

The transmission system is designed for links between an infrastructure and moving bodies ($10_1$, $10_2$) constrained to move along a determined path. The infrastructure has fixed transmitter/receiver stations distributed along the path, each having two transmitter/receivers allocated to two adjacent cells, e.g. ($E'_1$, $E_2$). The transmitters of two successive fixed stations allocated to the same cell are synchronized and they transmit using a coding system that is capable of tolerating or taking advantage of propagation over multiple paths.

11 Claims, 1 Drawing Sheet

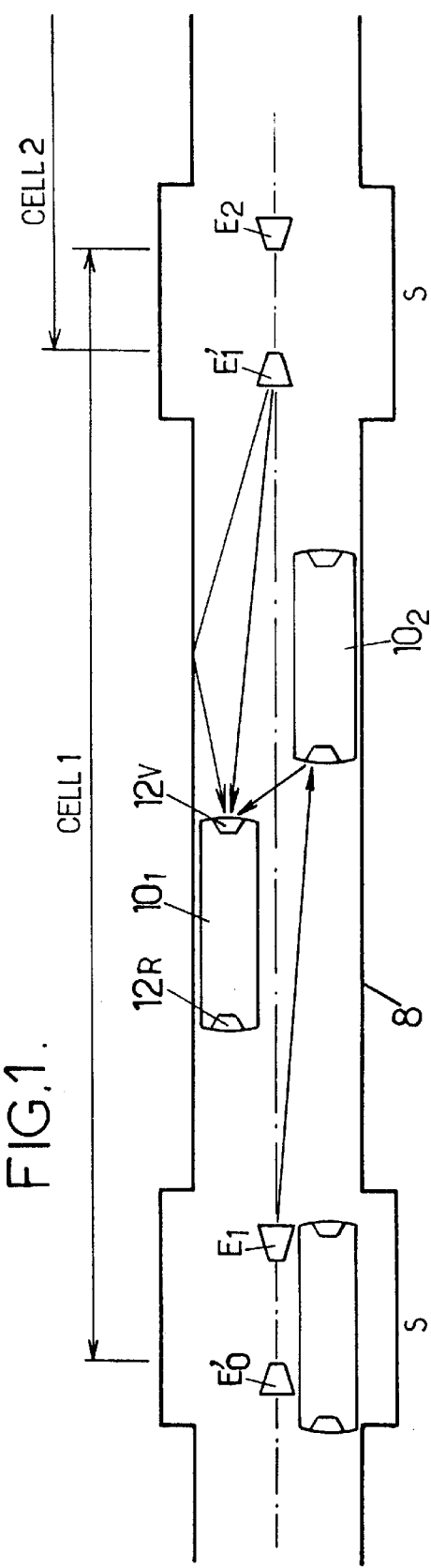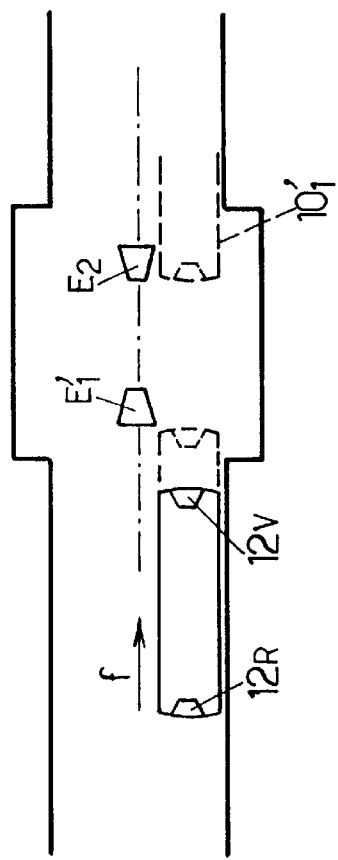

CELLULAR SYSTEM FOR TRANSMISSION OF INFORMATION BY RADIO BETWEEN AN INFRASTRUCTURE AND MOVING BODIES

BACKGROUND OF THE INVENTION

The present invention relates to cellular systems for transmission of information by radio between an infrastructure and moving bodies constrained to move along a determined path, the infrastructure having fixed transmitter/receiver stations distributed along the path.

A major application of the invention lies in the field of railways, in particular rail networks which are, at least in part, underground, where multiple reflections are prone to occur. Nevertheless, the invention is also usable in other fields, and in particular for communication with aircraft.

In rail applications, proposals have already been made to use radio transmission to replace links via low frequency carrier currents in the rails or in cables. In particular, proposals have been made to use the GSM standard for providing such transmission. Radio links have the advantage of not requiring special cables, or special dispositions for using rails that are already in use for traction current and in certain signalling installations. However, radio links need dedicated frequencies, are subject to unfavorable propagation conditions in tunnels which lead to multiple reflections, and may be disturbed by radio interference.

Conventional systems based on the GSM standard, which is a time division multiple access (TDMA) system, making use of base stations that are generally placed in the middles of cells do not make it possible to avoid all of those problems, even when implementing slow frequency hopping (SFH), unless radiating cables are used, which are expensive.

SUMMARY OF THE INVENTION

It is an object of the invention to provide a cellular system for transmission by radio that satisfies practical requirements better than previously known systems, in particular in that it ensures diversity of increased order (i.e. a greater number of received signals having statistically independent behavior) and in that it guarantees transfer or "handover" from one cell to another in a strong field.

To this end, the invention provides, in particular, a cellular system for transmission of information by radio between an infrastructure and moving bodies constrained to move along a determined path, the infrastructure having fixed transmitter/receiver stations distributed along the path, each transmitter/receiver station having two transmitter/receivers associated with two adjacent cells. The transmitters of two successive fixed stations allocated to the same cell are synchronized and use a coding system for transmission that makes it possible to tolerate or take advantage of propagation over multiple paths.

Among the coding systems that enable multiple paths to be tolerated, particular mention can be made of those known as orthogonal code frequency division multiplexing (OCFDM) used for direct digital broadcasting to moving bodies (DAB or DVB). Among coding systems that take advantage of multiple paths, mention may be made in particular of direct sequence spread spectrum coding, such as that described in the document "An overview of the application of code division multiple access (CDMA) to digital cellular systems and personal cellular networks", Qualcomm, May 21, 1992, document EX60-10010. Below, reference is made essentially to code division multiple access which leads to spectrum enlargement by a factor which is determined by the length of the code.

When the moving body is of considerable length, it is advantageous to provide it with one transmitter/receiver at the front and another at the rear; under such circumstances, the diversity provided is of order four, instead of two, as it is for a moving body having a single transmitter/receiver and receiving transmissions from two fixed stations placed at the ends of the cell.

In a rail link, each cell can be constituted by the space extending between two successive stations for passenger access, and each access station will then have two transmitter/receivers each allocated to a respective cell. One or more intermediate transmitter/receivers allocated to the same cell may also be located within the cell and synchronized with the transmitters at passengers access stations.

Changeover from one cell to another takes place at a base station placed at the end of the cell. Given that the moving body is then in the immediate vicinity of the transmitter/receiver, the back lobe of the directional antenna thereof still provides sufficient field to obtain a robust link and to make it possible to tolerate possible failure of one of the transmitter/receivers.

With long moving bodies, having a transmitter/receiver at each end, the two transmitter/receivers can change cell separately and successively as the body moves.

The antennas of transmitter/receivers in stations are designed to radiate essentially into their respective cells, so as to minimize disturbances in adjacent cells and to optimize cell coverage. Nevertheless, there is no need to strive for a very narrow lobe, particularly when the coding system used takes advantage of multiple paths, as is the case particularly with CDMA coding.

The above characteristics and others appear more clearly on reading the following description of particular embodiments of the invention, given by way of example. The description refers to the accompanying drawings.

BRIEF DESCRIPTION OF THE DRAWINGS

FIG. 1 is a theoretical diagram showing the distribution in space of the components of two fixed stations and moving bodies placed in a cell which is defined by the two fixed stations; and FIG. 2 shows a cell handover operation.

DETAILED DESCRIPTION

The diagram of FIG. 1 shows a tunnel 8 along which there are distributed ground base stations S which may be situated at the stations where passengers get on and off. The gap between two successive base stations constitutes a cell. Each base station is provided with two transmitter/receivers provided with antennas which, at a given base station, transmit in opposite directions. Thus, the antennas of transmitters $E_1$ and $E'_1$ belonging to two successive base stations transmit towards each other, i.e. into the cell 1. The antennas of transmitter/receivers $E_2$ and $E'_2$ of the following cell likewise transmit towards each other. The transmitter/receivers allocated to a given cell (or indeed all of the transmitters) are synchronized at symbol level. The two transmitter/receivers of a given cell transmit at the same carrier frequency and constitute a common channel.

To enable the system to operate in satisfactory manner, it is preferable for the distance between antennas allocated to a given cell to correspond to a propagation time that does not exceed about one-tenth the symbol duration.

In the embodiment shown, each moving body, e.g. $10_1$, includes a front transmitter/receiver 12V and a rear transmitter/receiver 12R. The terms "front" and "rear" designate the locations of the antennas and the directions in which they are pointing, while their electronics may be grouped together. It can be seen that each of the transmitters, e.g. 12V, receives signals coming from two transmitters $E_1$ and $E'_1$ directly and/or via multiple paths due to reflections, without it being possible in advance to determine which path will provide the highest received energy level. The transmitter/receiver 12V is designed to sum the energies received from the transmitters $E_1$ and $E'_1$. Because of the coding system used, which leads to very broadband modulation, energy summing takes place at demodulation level. If narrow band modulation were to be used, then the transmitters $E_1$ and $E'_1$ would interfere mutually.

The rear transmitter/receiver 12R also receives messages from the transmitters $E_1$ and $E'_1$ and it sums the energies. Consequently, order two diversity is performed twice.

This path diversity is in addition to the protection provided by spectrum spreading, and it is obtained without implementing any complex protocol.

Communication is transferred from one cell to another (hand over) when the train goes through a station S, and it likewise takes place in simple manner. FIG. 2 shows a train going from cell 1 to cell 2, moving in the direction of arrow f. When the front antenna 12V of the train $12_1$ comes up to the location of antenna $E'_1$ on entering the station, the corresponding transmitter/receiver of the train must switch from the channel of cell 1 to the channel of cell 2. This transfer can be controlled in various ways.

One particular solution consists in causing hand over to take place when the electromagnetic field received by the antenna 12V drops suddenly, from the maximal value it had previously. The back lobe of antenna $E_2$ is then sufficiently strong for the transfer to take place in a strong field, and therefore in a manner which is robust against disturbances. The train then travels through the station. The transmitter/receiver associated with the rear antenna 12R is switched from the channel of cell 1 to the channel of cell 2 when the rear antenna crosses the antenna $E_2$ on leaving the station.

It can be seen that channel changeover or cell changeover, which constitutes the weak point in any cellular system, takes place in a zone of high radio field, thus making the system robust. Because there are permanently two links (with the two ends of the train), a failure occurring in the infrastructure or on board the train does not give rise to serious disturbances, insofar as it affects only one station or train transmitter/receiver.

Numerous modifications of the invention are possible. A transmitter/receiver, likewise synchronized, can be placed between the other two at an intermediate location along the cell. It is not essential for the cells to be defined by stations.

I claim:

1. A cellular system for communication of information between a railway infrastructure and trains constrained to move along a predetermined path, wherein:

said infrastructure has a plurality of base stations distributed along said path and each between two mutually adjacent cells, each of said stations having a first transmitter-receiver with a directional antenna arranged to radiate mainly toward one of said two cells along said path and a second transmitter-receiver with a directional antenna arranged to radiate mainly toward the other of said two cells along said path whereby each cell is straddled by two said stations and which are mutually synchronized, and each of said trains carries at least one transmitter-receiver for communication with said stations straddling the cell in which the train is located whereby each train located in one cell can simultaneously communicate with the two stations which straddle the cell.

2. A system according to claim 1, wherein the coding system is based on orthogonal code frequency division multiplexing.

3. A system according to claim 1, wherein the coding system uses direct sequence spread spectrum coding.

4. A system according to claim 1, wherein said base stations are located at successive stations for passenger access.

5. A system according to claim 4, wherein one transmitter/receiver in a given said access station is placed at a train entrance to the access station and the other is placed at the train exit therefrom.

6. A system according to claim 4, wherein intermediate transmitter/receivers are placed within some at least of said cells and are synchronized with the transmitters at the access stations at both ends of the cell.

7. A system according to claim 1, wherein the two transmitter/receivers straddling a given said cell have antennas arranged to radiate toward each other.

8. A cellular system according to claim 1, wherein said trains has a said transmitter-receiver at the front and a said transmitter-receiver at the rear, whereby communication with the infrastructure has a diversity of order four.

9. A cellular system for communication of information between an infrastructure and moving bodies constrained to move along a predetermined path, wherein said infrastructure has a plurality of base stations distributed along said path and each between two mutually adjacent cells, each of said stations having a first transmitter-receiver having a directional antenna with a main lobe radiating toward one of said two cells and a back lobe of lesser power radiating toward the other cell, and a second transmitter-receiver having a directional antenna with a main lobe radiating toward the other of said two cells and a back lobe of lesser power radiating toward said one of said two cells, the two transmitter-receivers which straddle a same one of said cells being mutually synchronized and using coding that is tolerant to or makes use of multiple paths, whereby each cell is straddled by two said stations and each moving body located in one cell can simultaneously communicate with the two stations which straddle the cell.

10. A cellular system according to claim 9, wherein the transmitter-receivers of said stations have a mutual offset along said path such that the moving body crosses a zone where it is within a back lobe of both antennas.

11. A cellular system for communication of information between an infrastructure and moving bodies constrained to move along a predetermined path, wherein said infrastructure has a plurality of base stations distributed along said path and each between two mutually adjacent cells, each of said stations having a first transmitter-receiver having a directional antenna with a main lobe radiating toward one of said two cells, and a second transmitter-receiver having a directional antenna with a main lobe radiating toward the other of said two cells, the two transmitter-receivers which straddle a same one of said cells being mutually synchronized at symbol level, transmitting at a same frequency and using spectrum spreading and a type of coding that is tolerant to or makes use of multiple paths, whereby each cell is straddled by two said stations and each moving body located in one cell can simultaneously communicate with the two stations which straddle the cell.

* * * * *

UNITED STATES PATENT AND TRADEMARK OFFICE
CERTIFICATE OF CORRECTION

PATENT NO.  : 5,995,845
DATED       : November 30, 1999
INVENTOR(S) : LARDENNOIS It is certified that error appears in the above-identified patent and that said Letters Patent is hereby corrected as shown below:

On the title page:

item [30]  Foreign Application Priority Data should read--
    October 24, 1996   [FR]   France................96-12987

Signed and Sealed this

Fifth Day of December, 2000

Attest:

Attesting Officer

Q. TODD DICKINSON
Director of Patents and Trademarks